UNITED STATES PATENT OFFICE.

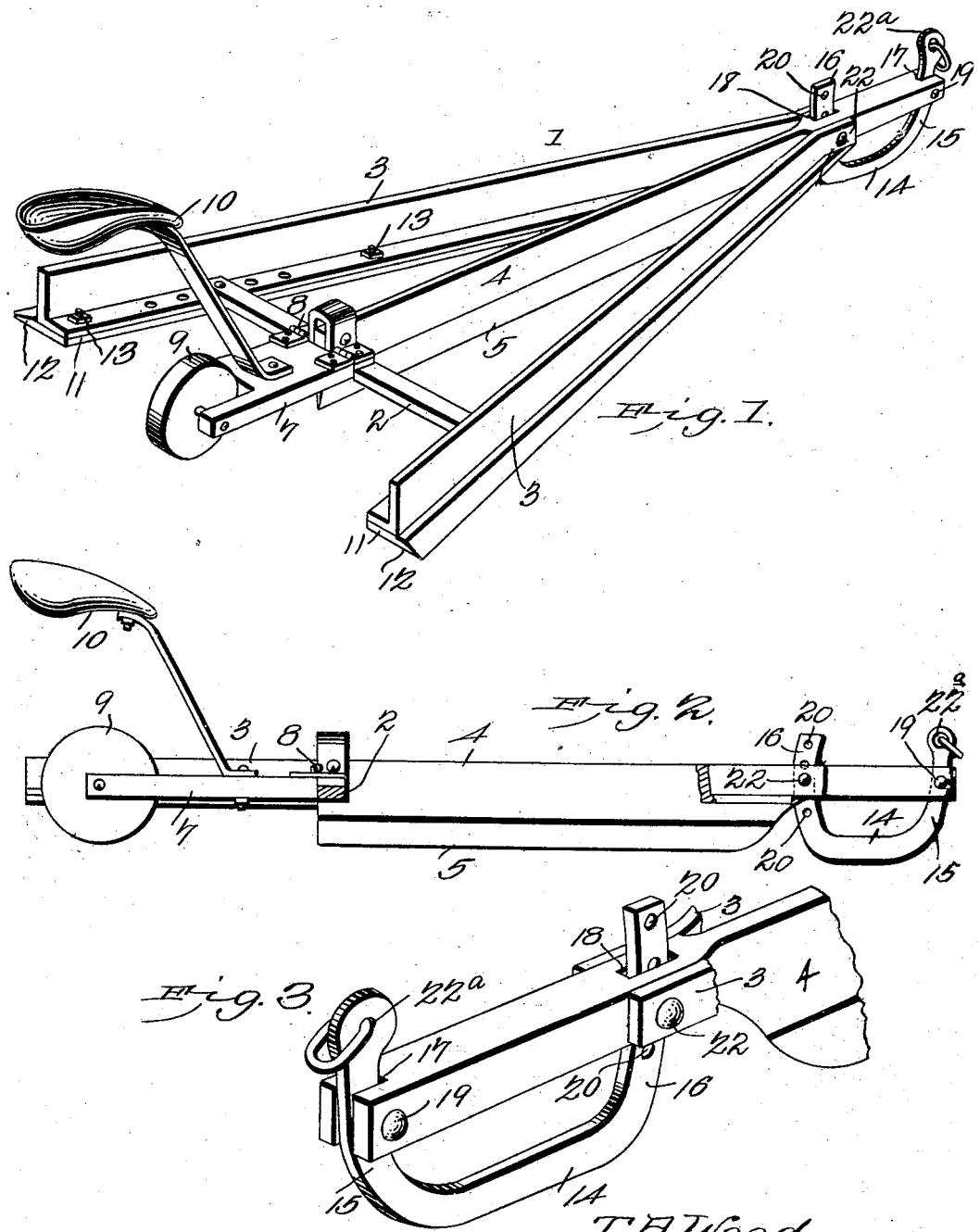

THOMAS A. WOOD AND JAMES W. SPANN, OF LUXORA, ARKANSAS.

STALK OR WEED CUTTER.

SPECIFICATION forming part of Letters Patent No. 712,883, dated November 4, 1902.

Application filed April 19, 1902. Serial No. 103,786. (No model.)

*To all whom it may concern:*

Be it known that we, THOMAS A. WOOD and JAMES W. SPANN, citizens of the United States, residing at Luxora, in the county of Mississippi and State of Arkansas, have invented a new and useful Stalk or Weed Cutter, of which the following is a specification.

Our invention is an improved stalk and weed cutter for cutting weeds and the stalks of cotton, corn, and cane close to the level of the ground to clear the field thereof; and it consists in the peculiar construction and combination of devices hereinafter fully set forth and claimed.

In the accompanying drawings, Figure 1 is a perspective view of a stalk and weed cutter constructed in accordance with our invention. Fig. 2 is a side elevation of the same, partly in section. Fig. 3 is a detail perspective view showing the adjusting-runner connected to the front end of the guide-runner.

In the embodiment of our invention we provide a frame 1, which is here shown as comprising a cross-bar 2 and a pair of side bars 3. The ends of the cross-bar are secured to the side bars at a suitable distance from the rear ends thereof, and the said side bars converge forwardly, as shown. In practice the frame 1 may be made of any suitable material. As here shown, the side bars 3 are made of angle-iron.

A longitudinally-disposed guide-runner 4 is employed, which has its front end disposed between the front ends of the side bars of the frame 1 and its rear end secured to the center of the cross-bar 2. As here shown, the guide-runner is a flattened bar of iron or steel disposed vertically in cross-section and beveled on opposite sides to form a lower cutting edge 5. We would have it understood, however, that the guide-runner may be made of any suitable material, and we do not limit ourselves in this particular. The front ends of the side bars are secured to the guide-runner near the front end of the latter, as shown. A bar or frame 7 has its front end flexibly connected to the central portion of the cross-bar 2 by a hinge 8. The said bar or frame 7 is here shown as forked at its rear end and as extending rearwardly from the cross-bar, and between the forks of said frame, bar, or arm 7 is mounted a roller 9. Said frame, bar, or arm, and said roller constitute a truck, which is drawn behind the frame 1, and the said truck carries the seat 10 for the driver, and it will be understood that owing to the flexible connection between said truck and the cross-bar of the frame 1 the major portion of the weight of the driver is borne by said truck and the frame 1 relieved thereof. The flexible connection between the truck and the cross-bar of the frame enables the truck to rise and descend as it encounters inequalities in the surface of the soil without affecting the frame 1. On the under sides of the side bars 3 are cutter-blades 11, which are disposed horizontally in cross-section and have their outer sides, which project laterally beyond the outer sides of the side bars 3, beveled on their upper sides to form the outer cutting edges 12. The said cutter-blades are here shown as detachably connected to the under sides of the side bars 3 by bolts 13. This enables the cutter-blades to be removed from the side bars when they need sharpening or become worn and require to be renewed.

We also provide an adjusting-runner 14. Preferably the same is of the construction shown and has a forwardly-inclined upwardly-extending arm 15 at its front end and an upwardly-extending curved arm 16 at its rear end. The said arms of the adjusting-runner are here shown as disposed in slots 17 18, respectively, with which the front portion of the guide-runner is provided. The front arm 15 of the adjusting-runner is pivoted to the guide-runner at the front end of the latter, as by a bolt 19, and the curved arm 16 of the adjusting-runner has a series of adjusting-openings 20, which are concentric with the pivot 19 and are adapted to register successively with an opening in the said guide-runner, a bolt or pin 22 being inserted in the opening in the guide-runner and in one of the openings 20, whereby the adjusting-runner may be disposed with its rear end raised or lowered to any desired extent with respect to the guide-runner. By lowering the rear end of the adjusting-runner the front end of the stalk-cutter may be raised from the ground, as will be understood. Hence the stalk-cutter may by means of the adjusting-runner be disposed so that its cutter-blades will be caused to run either horizontally on the ground or at an angle with relation thereto. In the upper end of the arm 15 of the adjusting-runner is an opening 22ª, which enables a single or double tree to be attached to the said arm of the adjusting-runner by means of a suitable link. Hence the said arm of the adjusting-runner is employed as the draft element of the stalk-cutter.

The operation of our improved stalk and weed cutter may be readily understood. The guide-runner, the lower edge of which cuts into the soil, directs the stalk and weed cutter in a right line and prevents lateral displacement thereof. The cutter-bars, which travel on or slightly above the surface of the ground, come in contact with the stalks and exert a draw or shear cut thereon owing to the forward motion of the stalk and weed cutter, and hence effectually sever the same, thereby clearing the field. The cut stalks may be readily turned under when the field is plowed.

Having thus described our invention, we claim—

1. In a stalk-cutter, the combination of a longitudinal guide-runner, the lower edge of which is adapted to enter the soil, a blade adapted to travel on the surface of the soil, and having a cutting edge on its outer side, said blade converging forwardly to said runner, and an adjusting-runner at the front end of the guide-runner to vertically adjust the front end of the stalk-cutter, substantially as described.

2. In a stalk-cutter, the combination of a longitudinal guide-runner, the lower edge of which is adapted to enter the soil, and a blade adapted to travel on the surface of the soil and having a cutting edge on its outer side, said blade converging forwardly to said runner and an adjusting-runner at the front end of and adjustably attached to said guide-runner, substantially as described.

3. In a stalk-cutter, the combination of a longitudinal guide-runner, a frame to which it is attached, said frame having a cutter, and an adjusting-runner, the latter being pivotally attached to the front end of the stalk-cutter and having a rear upstanding arm adjustably connected to an element of the stalk-cutter, substantially as described.

4. In a stalk-cutter, the combination of a longitudinal guide-runner, a frame to which it is attached, said frame having a cutter, and an adjusting-runner, the latter having upwardly-extending front and rear arms respectively pivoted and adjustably connected to an element of the stalk-cutter at the front end thereof, said front arm of said adjusting-runner forming the draft element, substantially as described.

In testimony that we claim the foregoing as our own we have hereto affixed our signatures in the presence of two witnesses.

THOMAS A. WOOD.
JAMES W. SPANN.

Witnesses:
WM. WOOD,
H. E. HOGAN.